(12) United States Patent
Lee et al.

(10) Patent No.: US 7,095,901 B2
(45) Date of Patent: Aug. 22, 2006

(54) APPARATUS AND METHOD FOR ADJUSTING FOCUS POSITION IN IRIS RECOGNITION SYSTEM

(75) Inventors: Won Hee Lee, Gyeounggi-do (KR); Ae Kyung Yang, Seoul (KR); Jang Jin Chae, Gyeonggi-do (KR)

(73) Assignee: LG Electronics, Inc., Seoul (KR)

( * ) Notice: Subject to any disclaimer, the term of this patent is extended or adjusted under 35 U.S.C. 154(b) by 561 days.

(21) Appl. No.: 10/096,848

(22) Filed: Mar. 14, 2002

(65) Prior Publication Data

US 2002/0131622 A1    Sep. 19, 2002

(30) Foreign Application Priority Data

Mar. 15, 2001 (KR) ............................ 2001-13376
May 12, 2001 (KR) ............................ 2001-25993

(51) Int. Cl.
    *G06K 9/40*     (2006.01)

(52) U.S. Cl. ................ 382/255; 382/117; 382/291; 351/208; 348/78

(58) Field of Classification Search ............ 382/115, 382/117, 218, 291, 255; 357/206, 207, 208, 357/210, 221; 359/210, 225, 226; 348/77, 348/78, 143; 340/156, 5.52, 5.53, 5.82, 5.83; 351/208

See application file for complete search history.

(56) References Cited

U.S. PATENT DOCUMENTS 5,963,366 A * 10/1999 Nakamura et al. .......... 359/389
6,526,160 B1 * 2/2003 Ito ............................ 382/117
6,594,377 B1 * 7/2003 Kim et al. .................. 382/117
6,714,665 B1 * 3/2004 Hanna et al. ............... 382/117

FOREIGN PATENT DOCUMENTS

JP      10-268372     10/1998

* cited by examiner

*Primary Examiner*—Sheela Chawan
(74) *Attorney, Agent, or Firm*—Fleshner & Kim LLP.

(57) ABSTRACT

The present invention relates to a method for adjusting a focus position in an iris recognition system, the method including the steps of: projecting a designated light for measuring a distance between the user and a camera; acquiring user images including the image projected by the light; and measuring a distance between the user and the camera by extracting the projected image by the light out of the user images and analyzing characteristics of the image. In addition, the present invention relates to an apparatus for adjusting a focus position in an iris recognition system, which enables to adjust the focal angle of an iris, the apparatus includes an illumination device; an iris recognition camera for acquiring user images having an iris image when the illumination device irradiates a light; an illuminator for helping the user with the focal angle according to sharpness of the visible ray that depends on the focal angle by transmitting a visible ray from the illuminator and by reflecting the user images.

15 Claims, 8 Drawing Sheets

Figure 1

(Prior art)

Figure 2.

(Prior art)

Figure 3.

(Prior art)

Figure 4.

(Prior art)

APPARATUS AND METHOD FOR ADJUSTING FOCUS POSITION IN IRIS RECOGNITION SYSTEM

BACKGROUND OF THE INVENTION

1. Field of the Invention

The present invention relates to an iris recognition system, and particularly to a method for adjusting a camera focus precisely on an iris of a user for increasing the user's convenience and for obtaining a more accurate iris image of the user. More particularly, the present invention relates to a focus position adjusting apparatus and method in an iris recognition system, which enables to adjust the distance between the user and the camera and focus angle between the user and the camera more accurately.

2. Description of the Related Art

As well known already, there have been a number of systems for security, crime prevention, and identity authentication, such as the traditional contact cards system or the non-contact cards system and up to the fingerprint recognition system. The iris recognition system has certainly joined this stream for authenticating a person's identity before allowing or rejecting the person to enter a particular place or to access specific data.

Among those, the iris recognition system is considered to be the best for its high recognition rate compared with the fingerprint recognition, and for its high accuracy. The iris recognition system is a technique for authenticating a person by comparing a pre-registered iris data with a new iris data that has been prepared by capturing iris images using a video camera and making iris pattern features into data using an image process technique.

Figure 1:
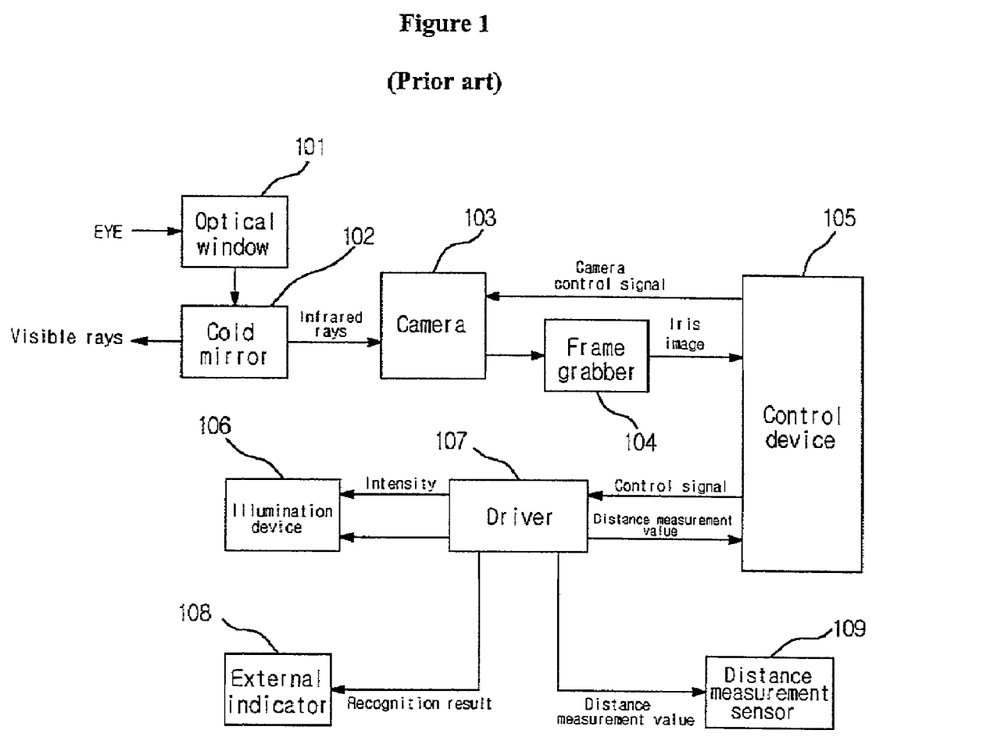
FIG. 1 is a schematic diagram of an iris recognition system in the prior art.

FIG. 1 is a schematic diagram of a general iris recognition system in a related art.

With reference to FIG. 1, operation of the iris recognition system is now explained below.

As a user approaches the iris recognition system, a distance measurement sensor 109 measures the distance between the user to the system, and a controller 105, having received the distance measurement value through an actuator 107, decides whether the distance measurement value is within the operation limit.

If it turns out that the user is within the operation limit, a control signal is sent out to the actuator 107 to extract iris images. And, the actuator 107 sends an active signal to an external indicator 108 and lets the user know that the system is on. When the user puts his or her eyes on an optical axis of a camera 103 through an optical window 101, a cold mirror 102 blocks a visible ray and passes infrared rays.

And, the system indicates whether the iris of the user should be placed to make sure the user's eyes are properly positioned on the optical axis of the camera 103.

The control device 105, on the other hand, is provided with the distance from the distance measurement sensor 109 to the user, and based on the distance measurement value, it calculates zoom and focus values of the camera 103 and performs zoom in/zoom out and focusing control. Later, the control device 105 adjusts the intensity of an illumination device 106 through the actuator 107 in accordance with the distance measurement value, and photographs the iris image using the camera 103.

The photographed iris image goes through a signal process to be appropriate for the iris image analysis at a frame grabber 104, and based on the information about the processed iris image, the control device 105 recognizes the iris and decides whether or not to authenticate the user.

The performance of this iris recognition system is totally dependent on how fast and how accurately it can recognize the iris.

There are actually a few techniques of extracting the iris image in order to photograph the iris of the user from an appropriate distance. For example, sometimes the user himself has to focus the camera by looking at the screen and moving back and forth, or in some cases, several cameras are used at one time to find out where the user's face and eyes are and photograph the user's iris image. Also, some obtain the iris image by using the distance measurement sensor which measures the distance between the camera and the user in order to focus the camera automatically.

First of all, it would be pointless to say that the user would feel uncomfortable if he personally has to move around within a certain distance to focus the camera, while looking at the screen. Also, in this case, a single light source is used. Therefore, if the user wears glasses, the reflected image from the glasses makes it difficult to catch more accurate iris images.

To prevent such problem, the user should keep moving while looking at the screen for himself until no reflection occurs, increasing inconvenience to the user.

Fortunately, using several cameras to focus the camera and obtain iris images has somewhat solved the trouble the user had to go through. But this time, the equipment is very complicated for a normal person to operate and it required very sophisticated control. In other words, the system uses two cameras for finding out where the user's face and eyes are, and another camera for obtaining the iris image.

Although the system is convenient to use in that the user does not have to focus his eyes personally for the iris recognition because the system automatically focuses the camera and catches the iris image, the system configuration itself is very complicated in order to use several cameras and operate each camera systematically and electrically, Lastly, in case the distance measurement sensor is used to focus the camera and photograph iris images, the distance measurement sensor senses a person's approach and focuses the camera based on the inputted images in possession and the focus values outputted from the camera.

However, since this technique also uses a single light source, the reflection problem due to the glasses of the user is likely to happen any time. As an attempt to avoid the secondary reflex due to the glassed, three LED (light-emitting diode) illuminations were put on the left side, the right side, and the upper side. But it was still uncomfortable to use because one should keep changing positions of the illuminations to get the images.

Figure 2:
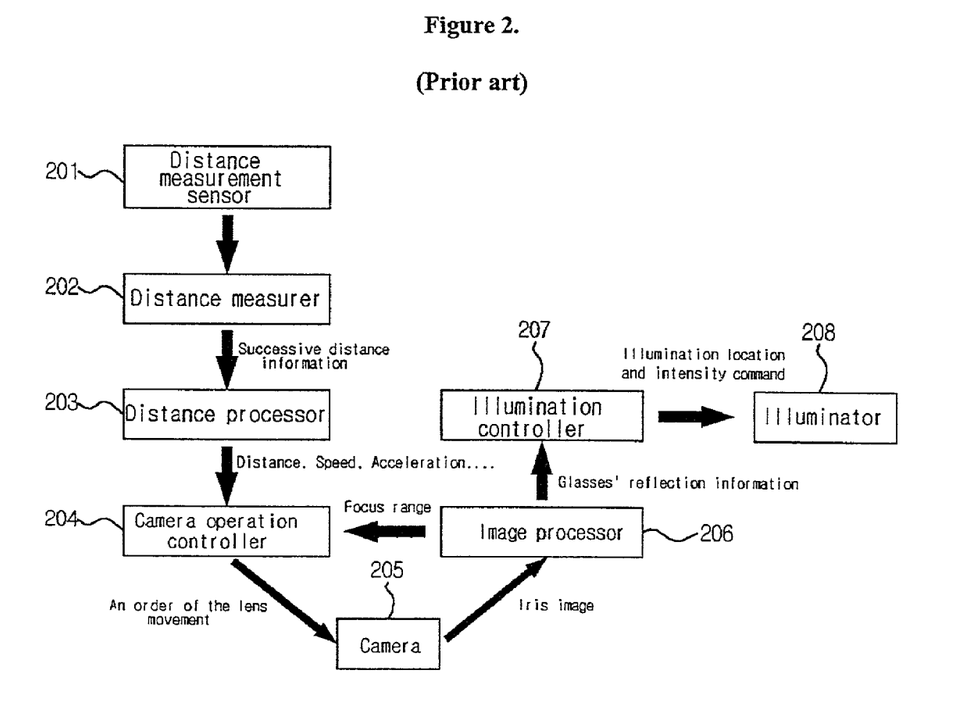
FIG. 2 is a block diagram showing a configuration of an autofocus adjusting device using a distance measurement sensor in the prior art.

FIG. 2 is a block diagram of an autofocus adjusting device using a distance measurement sensor in the prior art.

As shown in the drawing, a distance measurer 202 measures the distance between the user and the camera 205 at designated regular time intervals using the distance measurement sensor 201, and outputs the distance information successively. A distance processor 203, using the distance information, catches characteristics of the user's movement. More specifically, based on that successive distance information, the distance processor 203 measures the user's movement speed. If the speed is a positive number (+), it means that the user is approaching, and if the speed is a negative number (−), it means the user is going away, and if the absolute speed is within the limit, it means the user stopped moving.

A camera operation controller 204, using the information about distance, speed and acceleration provided from the distance processor 203, controls the operation of the camera 205 when the use stands still. Here, even when the user's movement is not yet stabilized, it is important to estimate beforehand where the user is going stop and drive the camera's lens to that position because it certainly reduces time necessary for focusing the camera.

When the user's movement is stabilized, the camera operation controller 204 adjusts the camera's zoom and focus based on the distance measurement values. Considering that the user can't be perfectly still but keeps moving little bit and the measured distance values are not necessarily the actual distances to the user's eyes, it is rather natural to accept the possibility of measurement error to a certain degree. Therefore, a fine adjustment process is carried out involving the camera operation controller 204, in which the camera operation controller focuses the camera by analyzing the successively inputted iris image from an image controller 206, calculating a focus range therefrom, moving a zoom and focus lens until the focus range becomes appropriate for performing authentication, and continuing the tracking until a maximum value is obtained.

However, if the user is wearing glasses, the iris image of the user could be reflected in accordance with the angle between the glasses and the LED mounted at an illuminator 208. To prevent this problem, the image processor 206 detects a possible reflection degree before calculating the focus range, and outputs the glasses reflection information to an illumination controller 207.

In a way of avoiding the glasses' reflection, the illumination controller 207 controls the lighting condition of the illumination LED based on the glasses reflection information, and changes the reflected positions from the glasses as well. In this manner, the reflection by the glasses can be prevented and the iris image recognition can be done successfully through an analysis on the iris images obtained from the camera 206.

However, one problem of the system is that it depends too heavily on the distance measurement sensor to measure the motion direction and distance of the lens when the camera needs to be focused. Thus, if the distance measurement sensor does not give accurate information on the distance to the user's eyes, which unfortunately does occur very often, the motion direction of the lens could be designated to a wrong direction and the time for adjusting the focus might take longer than expected. In addition, since the user has to approach within the permitted limit of the iris recognition system, the system is not that convenient for the user.

On the other hand, according to the traditional iris recognition system for use of the video conference, to recognize the user's iris, the user has to put his eyes on a position where the distance and the focus adjusting image (using two points) in the iris recognition camera lens are conformed with each other. Once the user gazes the point where two points in the camera converge, the system starts the iris recognition.

However, putting the two points together in the system described above works conveniently for the user only when the iris recognition camera is already being focused, but since the system uses a single focus lens, the user sometimes has to focus the camera if necessary. Therefore, the system is not that convenient to use especially when the iris recognition camera is not focused because the user has to not only adjust the distance between the iris recognition camera and him but also conform the two points in the camera.

That is to say, the system gives inconvenience to the user, making him move to a position where two points in a small lens conform to each other while looking at the camera lens.

Accordingly, an iris recognition apparatus needs to be developed, which enables to measure the distance between the user and the camera more accurately, more conveniently, and more quickly, and to focus the camera automatically.

Figure 3:
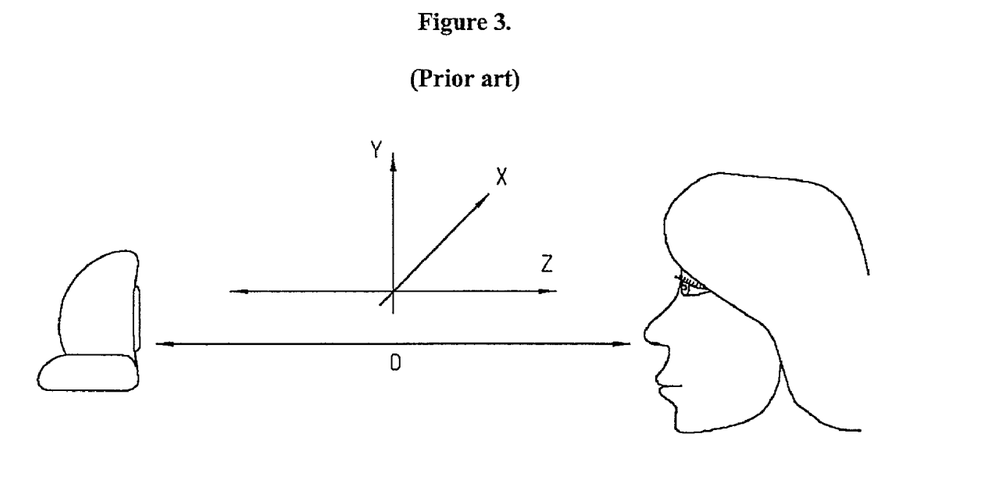
FIG. 3 is a diagram explaining a relation between a camera and a user in terms of position and distance in an iris recognition system.

FIG. 3 is a diagram explaining a relation between the iris recognition camera and the user in terms of position and distance.

As depicted in the drawing, the iris recognition system requires the user to adjust the focal distance (D) and the focal angle accurately while watching the iris recognition camera to get desired iris images.

The focal distance (D) is Z operating range between user and device, and the focal range is X-Y operating range in FIG. 3.

Figure 4:
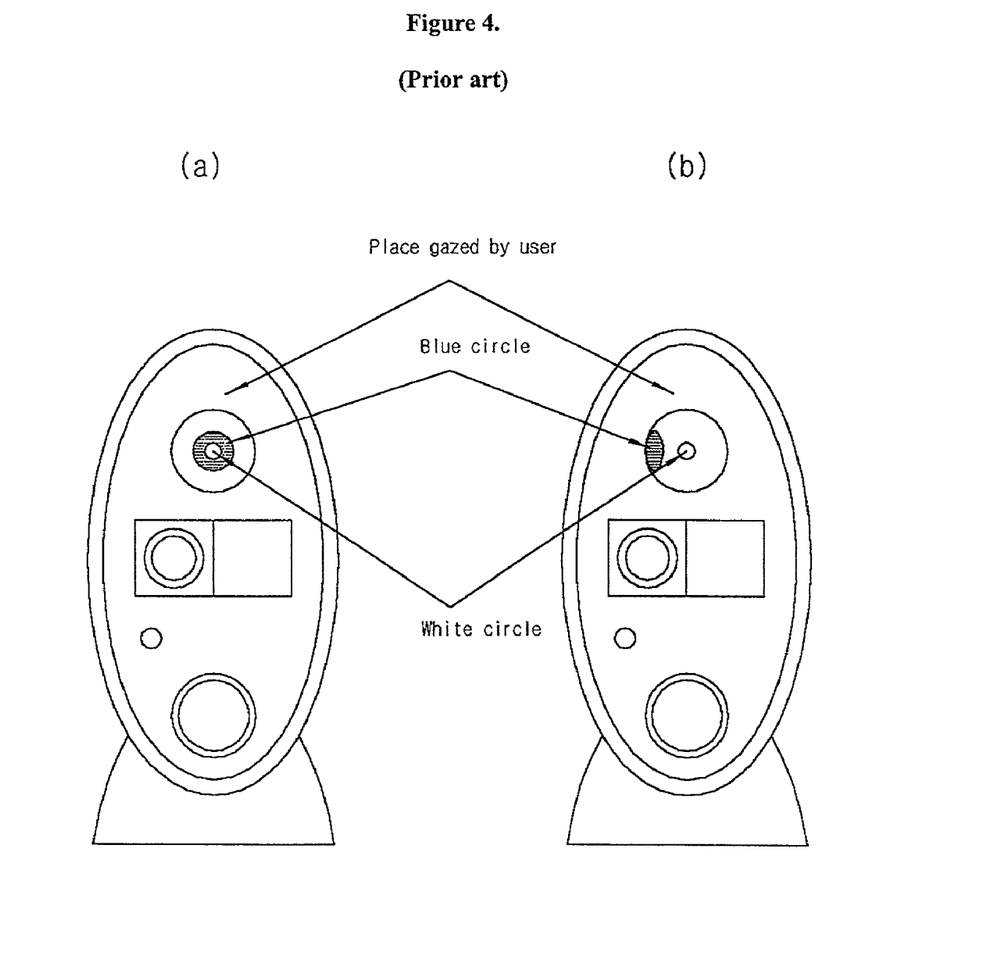
FIG. 4 is an explanatory diagram showing how an iris recognition system with a single focus is focused in the prior art.

According to the system shown in FIG. 4, the user is supposed to put his eyes on the place where the distance and the focus adjusting image in the iris recognition camera with a single focus lens (use two circles with different colors) conform to each other. In short, the system does not start iris recognition until the user looks at the place where two points in the camera converge.

In the present context, the term focus position is intended to indicate that the user's position which can acquire image to recognize iris. For a better adjustment of the focus position, the user is recommended to keep a certain distance from the camera at a certain distance (i.e., 44 cm to 48 cm), and is encouraged to adjust the focal angle using a blue circle and a white circle in the camera lens.

In other words, the user is supposed to keep looking at the camera and move towards where he can adjust the focal angle until the two circles become one.

FIG. 4(a) illustrates a case where the focal angle is adjusted and (b) illustrates a case where the focal angle went wrong.

However, the apparatus encourages the user to practice to get the feeling of the focus position beforehand using a tapeline or something until he becomes intuitively accustomed to the focus position to a certain level. But for the user, it is rather difficult and inconvenient to adjust the focus position, making the white circle out of those two circles looking in the camera lens become one with the blue circle at the same time. Considering the small sized lens and visual difference of the user's eyes, the task seems to be even harder.

Moreover, because the system uses two lenses and the distance between the LED and the lens is very short, the user, even when he is not at the right front of the lens, could see the LED light, so he cannot be sure whether the focal angle is properly adjusted or not. Further, there is a white point marked on the surface of the lens such that the user can see the LED light from any angle and focus, but this can be an obstacle to obtain good iris images. On top of boring a hole in the reflex mirror to transmit the LED light, if the user looks at the iris recognition camera from a different angle rather than the front, it is very hard to adjust the focal angle since the camera would not look like a circle to the user then.

SUMMARY OF THE INVENTION

It is, therefore, an object of the present invention to provide an apparatus and method for obtaining iris images in an iris recognition system more accurately and more conveniently.

To achieve the above object, there is provided an apparatus for adjusting a focus position in an iris recognition system, the apparatus comprises a camera for a video conference, which acquires images of a user participating in a video conference; an iris recognition camera means, which acquires eye images of the user subject to iris recognition; a distance detection pointer, which projects a specific image to the user for use of distance detection in order to measure a distance between the user and the camera; and a distance calculator, which calculates movement of pointer in the user image by a distance between the pointer image change and the user by performing an image analysis of the user image, which has been photographed by the camera for a video conference and projected by the distance detection pointer.

Another preferred embodiment of the present invention provides a method for adjusting a focus position in an iris recognition system, the method including the steps of: projecting a designated light for measuring a distance between the user and a camera; acquiring user images including the image projected by the light; and measuring a distance between the user and the camera by extracting the projected image by the light out of the user images and analyzing characteristics of the image.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Preferred embodiments of the present invention will now be described with reference to the accompanying drawings.

In the following description, same drawing reference numerals are used for the same elements even in different drawings. The matters defined in the description are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 5:
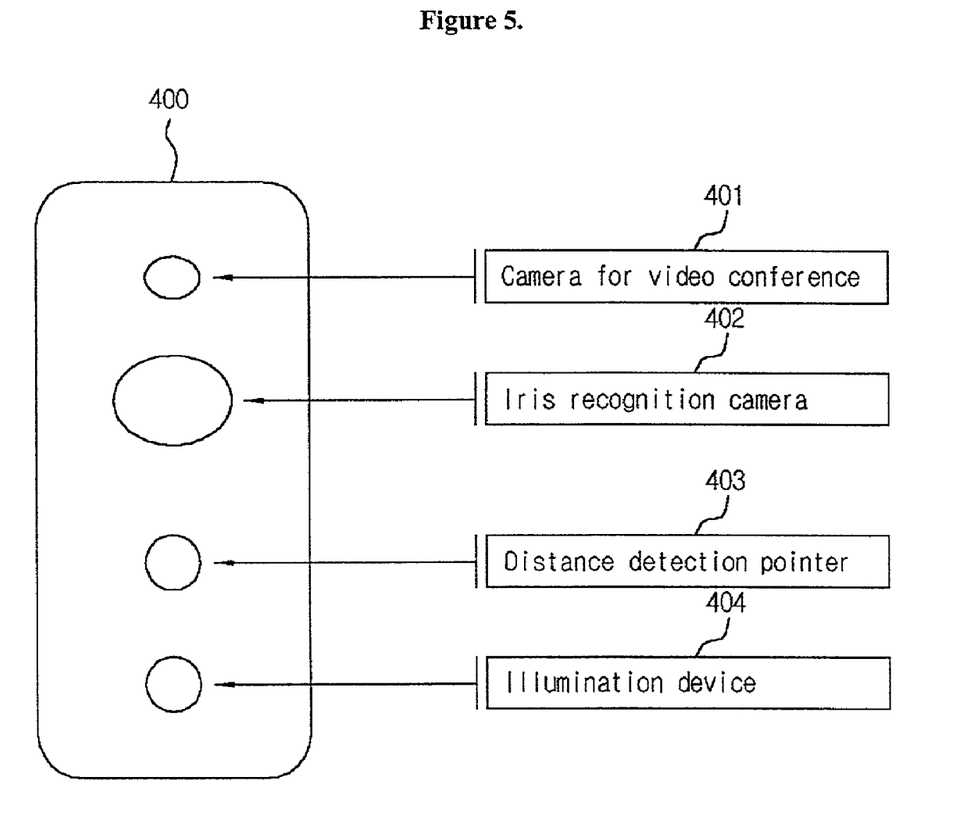
FIG. 5 is a front view of an optical unit in an iris recognition system according to a first preferred embodiment of the present invention.

FIG. 5 is a front view of an optical unit of an iris recognition system according to a first preferred embodiment of the present invention.

Referring to FIG. 5, the optical unit 400 in the iris recognition system includes a camera for a video conference 401 for photographing images of a user during the video conference; an iris recognition camera 402 for identifying the user; a distance detection pointer 403 for projecting a designated light to the user; and an illumination device 404 for irradiating an appropriate light when photographing iris images.

Specifically speaking, the camera for a video conference 401 is used for acquiring the images of the user (mainly the user's face) for the sake of the video conference.

The iris recognition camera 402 is used for acquiring eye images of the user necessary to recognize the user's iris.

The distance detection pointer 403 is used for projecting a specific light to the user (mainly to the user's face) in order to measure the distance between the user and the camera. For instance, the distance detection pointer 403 projects an infrared spot that is usually invisible to the user's eyes.

The illumination device 404 is used for providing an illumination or light necessary for photographing the iris images to be recognized.

Figure 6:
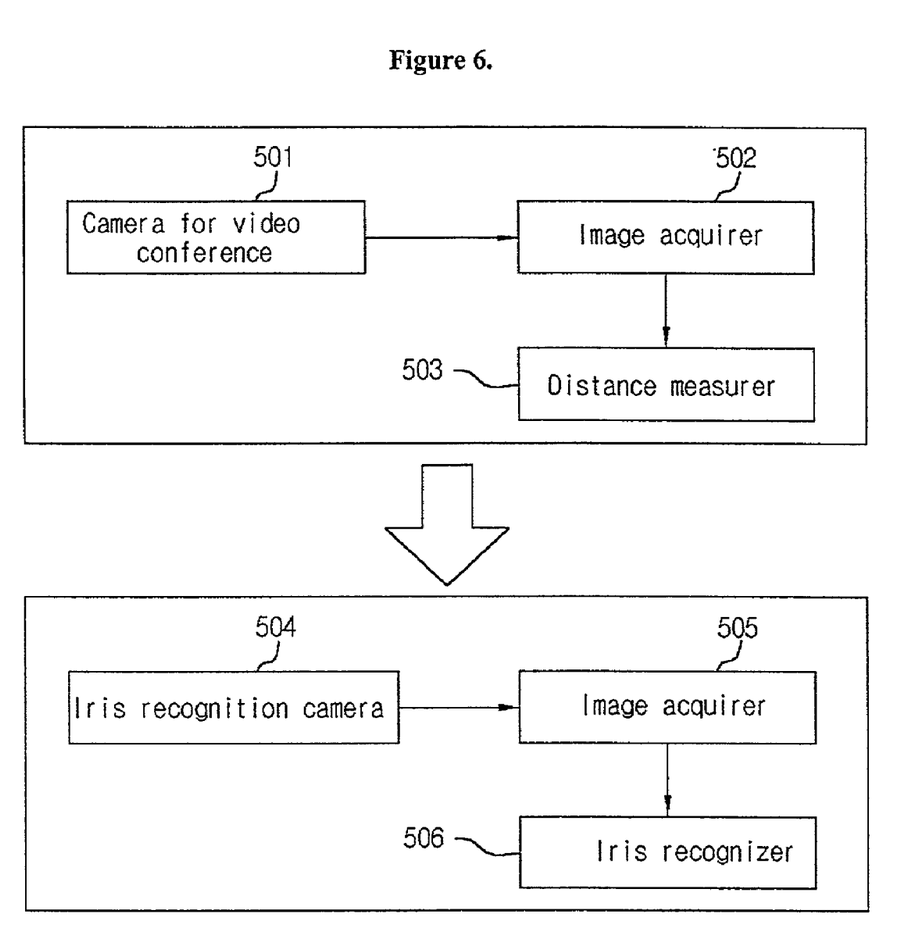
FIG. 6 is a block diagram showing an iris recognition system for a video conference according to the first preferred embodiment of the present invention.

FIG. 6 is a block diagram of an iris recognition system for a video conference according to the first preferred embodiment of the present invention.

As shown in the drawing, the system includes a camera for the video conference 501 for photographing user images, an image acquirer 502 for acquiring the user images (face) photographed by the camera for the video conference 501, and a distance measurer 503 for extracting a specific image having the projected spot form among the acquired user's face images and for obtaining distance measurement information about the distance between the user and the camera based on a real time analysis of the specific image.

Also, the distance measurement information is usually used for adjusting a focus which is later necessary to the iris recognition, the system further includes an iris recognition camera 504, an iris image acquirer 505 and an iris recognizer 506 for iris recognition and focus adjustment.

Thusly configured system will be now explained in more details with reference to one embodiment of the present invention.

The camera for a video conference 501 photographs the user, mainly the user's face image. This photographed face image includes an infrared spot image to which a light is projected from the pointer for measuring the distance to the user.

Therefore, the image acquirer 502 acquires the user's face image together with the infrared spot image that is projected to the face image, and the distance measurer 503 calculates the distance between the user and the camera based on the analysis of the position, the size, and position changes of the acquired infrared spot image on the face.

A series of the procedures described above, that is, acquisition of the user's face image using the iris recognition camera 504, the image acquirer 505, and the iris recognizer 506, extraction of an eye image among the face image, iris recognition from the eye image, and recognition based on the data base by analyzing the recognized iris pattern information, can be accomplished according to the means and methods of the prior art.

Figure 7:
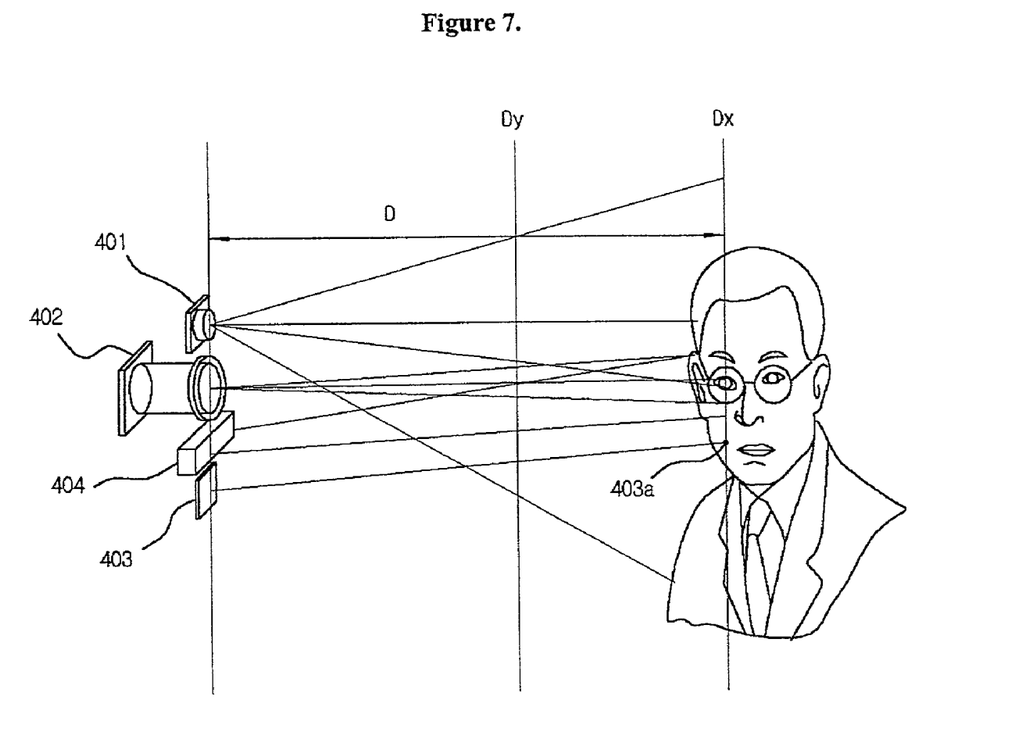
FIG. 7 is a diagram explaining a distance measuring method according to the first preferred embodiment of the present invention.

FIG. 7 is a diagram explaining a distance measuring method according to the first preferred embodiment of the present invention.

With reference to FIG. 7, the distance detection pointer 403 projects an infrared spot image 403a to the user for measuring the distance between the user and the camera. Considering the operation method of the iris recognition system, this spot image 403a will be the one that is projected to the user's face.

After the distance detection pointer 403 emits the spot image, the camera for a video conference 401 photographs the user's face image.

At this time, the infrared spot image 403a projected to the user's face is acquired as well. In the meantime, the position of the infrared spot image 403a on the user's face changes depending on the distance between the user and the camera. Similarly, the size of the infrared spot image 403a also varies depending on the distance between the user and the camera, which is because of the light diffusion.

In other words, if the distance between the camera and the user is far (Dx) and near (Dy), the size of the spot image 403 as well as the position of the spot image 403a on the user's face vary accordingly.

Referring to FIG. 7, if the user gets nearer to the camera, that is, form the far distance (Dx) to the near distance (Dy), the infrared spot image 403a will move downwards on the user's face, and to upwards in the opposite case.

Therefore, the image acquirer (refer to 502 in FIG. 7) and the distance measurer (refer to 503 in FIG. 7) can also calculate the distance between the user and the camera by analyzing the infrared spot image 403a.

On the other hand, the image acquirer 502 and the distance measurer 503 can specify the distance for the sake of the user by categorizing the measured distance between the user and the camera into three categories, for example, an appropriate distance, a far distance, and a near distance, and let the user know about this through a designated indicator. For example, if the distance between the user and the camera is appropriate, a green light is turned on, and if the distance is too near, a yellow light is turned on, and if the distance is too far, a red light is turned on so that the user can change his position accordingly. One more thing is that after the user's position is calculated, it is also possible to obtain a very accurate iris image of the user without moving the user by using zoom in/zoom out and autofocus functions of the iris recognition camera 504.

Based on the calculated distance information, it is decided whether the user entered to the iris recognition domain, a domain where the camera is focused, and if he entered to the accurate iris recognition domain, the iris recognizer is actuated to enable the iris recognition using a single focus lens. And then, the iris recognition camera within the accurate iris recognition domain photographs the user's iris image, and the photographed image is processed to a designated iris image to be compared with other accumulated data later, eventually identifying the user. In fact, this series of the procedures are pretty much identical with the method in the prior art.

The spot image for measuring the distance is not visible to the user since the invisible infrared rays are applied thereto.

Besides the usage convenience of the infrared rays, another advantage of using the infrared rays is that the user does not have to feel insecure about projecting the infrared spot images to his face.

Especially the present embodiment enables to measure the distance between the user and the camera based on the analysis of the user images which are photographed by the camera for a video conference in the iris recognition system for use of the video conference.

In addition, the present embodiment enables to measure the distance between the user and the camera by projecting an infrared spot image and analyzing where the spot image is going to be positioned on the user's face.

Further, the present embodiment enables to measure the distance between the user and the camera by using an infrared pointer that is inexpensive yet easy to operate without using a separate distance measurement sensor additionally.

Lastly, the present embodiment enables to measure the distance between the user and the camera through a real time analysis of the images photographed by the camera for a video conference, and to focus the camera more automatically and accurately for a better iris recognition based on this distance information.

Figure 8:
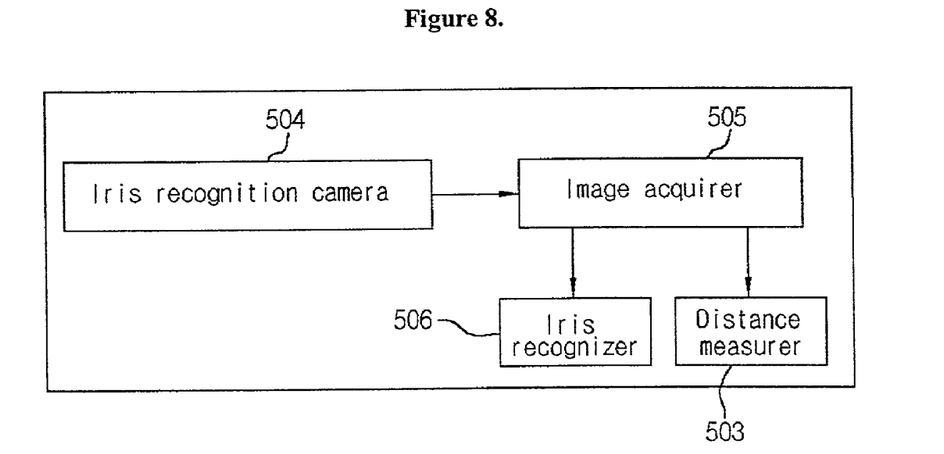
FIG. 8 is a block diagram of an iris recognition system for a video conference according to a second preferred embodiment of the present invention.

FIG. 8 is an explanatory diagram of the second preferred embodiment according to the present invention.

Most part of the second embodiment is pretty much same with the first embodiment except that the camera for a video conference together with the iris recognition system is not used in this case. Instead, the iris recognition camera is employed for photographing a large area, if necessary.

More specifically, the user's face image is acquired following the same method introduced in the first embodiment, not using the camera for a video conference but using the iris recognition camera. Afterwards, the distance between the user and the camera is measured, and in case the user is within an appropriate distance from the camera, the user's iris image is acquired to identify the qualified user.

The third preferred embodiment of the present invention is not explained.

Figure 9:
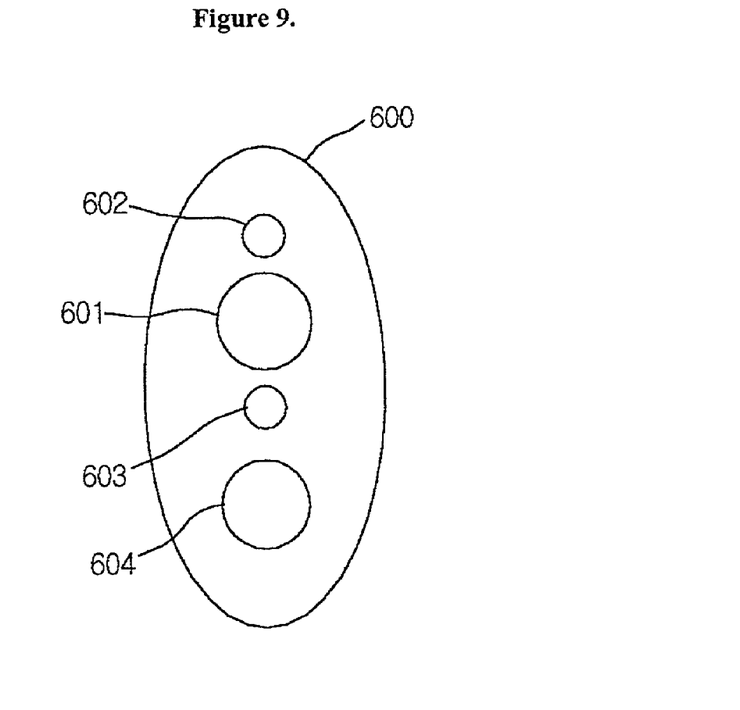
FIG. 9 is a front view of an optical unit in an iris recognition system according to a third preferred embodiment of the present invention.

FIG. 9 is a front view of an optical unit of an iris recognition system according to the third preferred embodiment of the present invention.

The iris recognition system 600 depicted in FIG. 9 includes an iris recognition camera 601 for photographing the user's iris image, at least one distance detection pointer 602 and 603 for detecting the distance between the user and the camera, and an illumination device 604 for irradiating a light when photographing the iris image.

Particularly, the iris recognition camera 601 is used for acquiring the spot image that is needed to measure the distance between the user and the camera, and acquiring the user's eye image to recognize the user's iris.

The distance detection pointers 602 and 603 (usually, a pair of them are preferably used) are used for projecting the symmetric spot images to the user's face. For instance, the distance detection pointer projects the invisible infrared spot image to the user. To this end, an infrared ray light emitting diode (IR LED) is preferably used for the distance detection pointers 602 and 603.

Lastly, the illumination device 604 provides a light necessary for photographing the iris image to be recognized.

Figure 10:
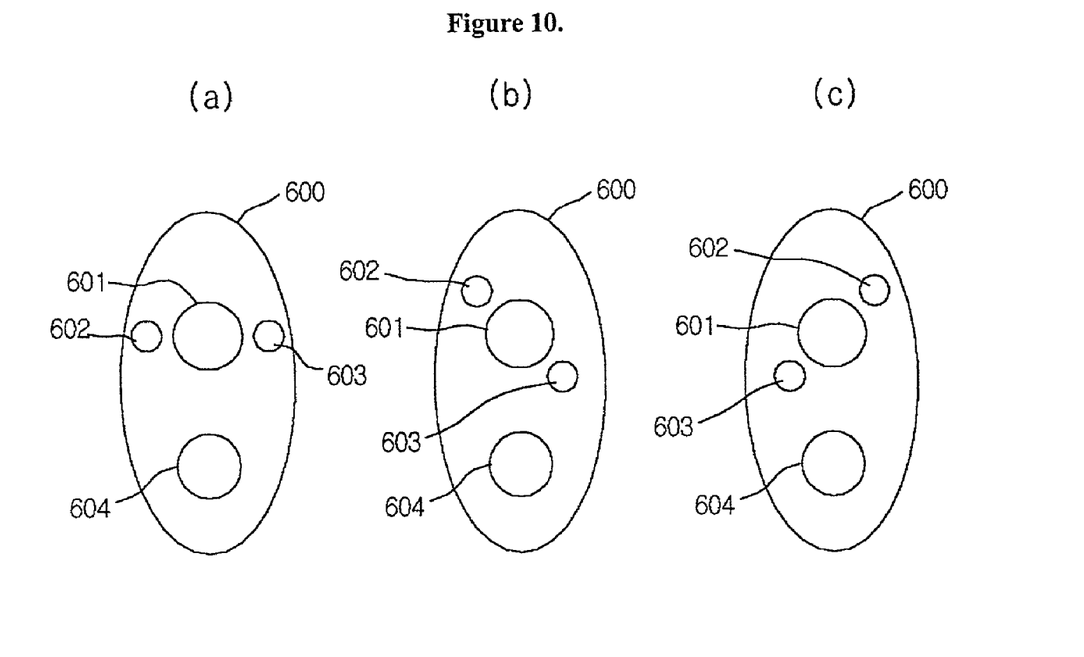
FIG. 10 is an exemplary diagram showing an infrared light emitting diode (LED) array method according to the third preferred embodiment of the present invention.

FIG. 10 is an exemplary diagram explaining how to array the infrared ray light emitting diode in the third preferred embodiment of the present invention.

With reference to FIG. 10, the iris recognition system includes the iris recognition camera 601 inside of the optical unit 600, and the distance detection pointers 602 and 603 being positioned symmetrically in both sides of the camera 601 (refer to FIG. 10 (a)). Alternatively, it is possible to place the distance detection pointers 602 and 603 being in 45 degrees symmetric positions with respect to the iris recognition camera 601 (refer to FIG. 10(b) and (c)).

Moreover, the system further includes the illumination device 604 for photographing the iris images.

Figure 11:
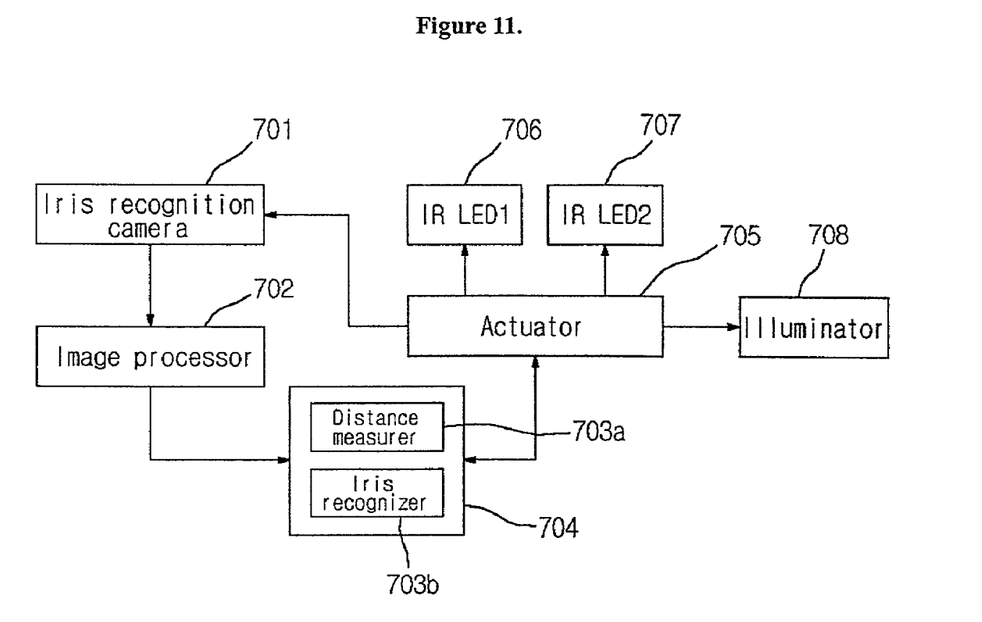
FIG. 11 is a block diagram of an iris recognition system according to the third preferred embodiment of the present invention.

FIG. 11 is a block diagram showing a configuration of the iris recognition system according to the third preferred embodiment of the present invention.

As shown in FIG. 11, the iris recognition system includes an iris recognition camera 701 for acquiring images necessary to the distance measurement and iris recognition; an image processor 702 for processing the images that are photographed by the iris recognition camera 701; a controller 704 which includes the distance measurer 703a for measuring the distance between the user and the camera based on the real time analysis of the processed images and the iris recognizer 703b for performing iris recognition on the processed images; an actuator 705, being connected to the controller 704, for driving the iris recognition camera 701, distance detection pointers 706 and 707, and the illuminator 708; at least a pair of distance detection pointers 706 and 707 for projecting a spot image for use of distance measurement under the control of the actuator 705; and an illuminator 708 which actuates under the control of the actuator 705.

The iris recognition camera 701 generally photographs the user's face image to extract his iris image therefrom. Especially in this embodiment, the iris recognition camera 701 photographs the images for use of distance measurement as well.

More specifically, the actuator 705 actuates the distance detection pointers 706 and 707 including the infrared light emitting diode in order to project the infrared spot image to the user's face. Then, the iris recognition camera 701 photographs the user's face image to which the infrared spot image is projected. Here, the photographed face image includes the infrared spot images that have been projected from the distance measurement pointers IR LED1 and IR LED2.

The image processor 702 acquires the infrared spot images projected to the user's face, and analyzes their positions on the face, sizes, position changes and sharpness, helping the distance measurer 703a to be able to calculate the distance between the iris recognition camera and the user. Especially, the reason for putting a pair of infrared light emitting diode symmetrically and getting the symmetric spot images is to make it easier to do the distance measurement by maximizing the location and angle of the projected light, and to get rid of any reflection from things like the glasses.

Using this distance measurement information, the iris recognition camera 701 photographs the images necessary to recognize the iris. After that, the iris recognition camera 701, the image processor 702, the iris recognizer 703b, and the illuminator 708 are used for acquiring, recognizing the iris images, and analyzing the recognized iris pattern information in order. In this manner, it becomes possible to identify the qualified user using the database prepared for the iris recognition.

Figure 12:
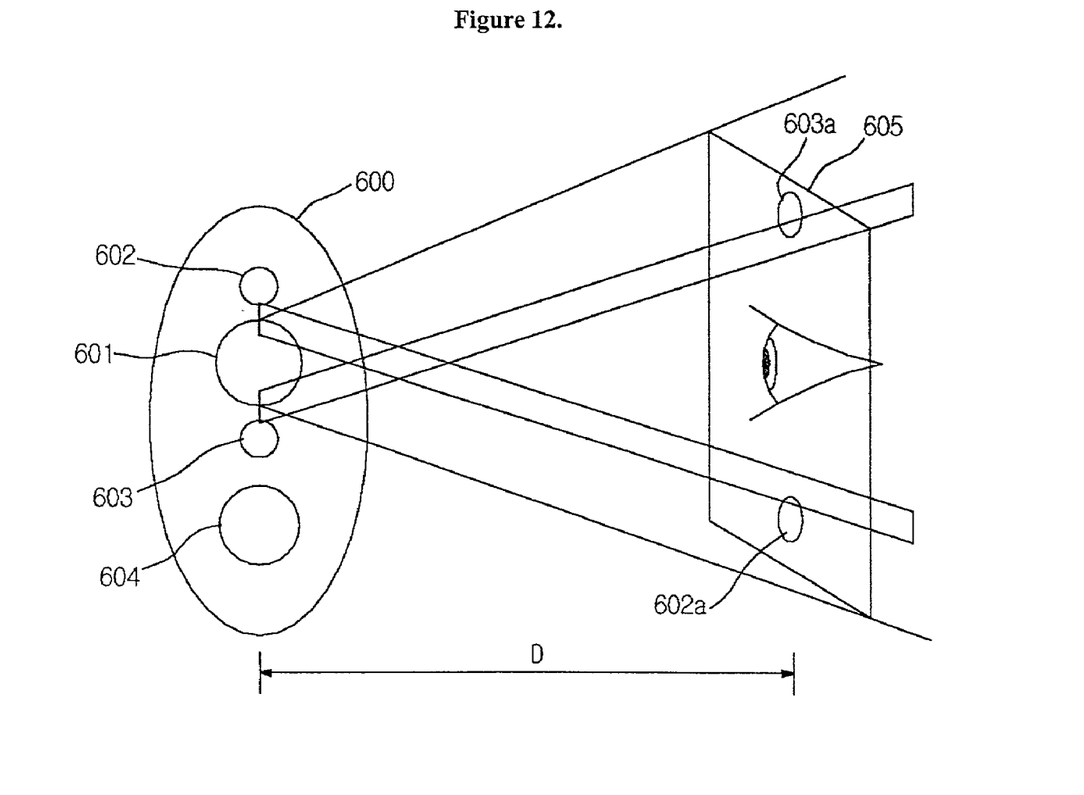
FIG. 12 is an exemplary diagram explaining a distance measuring method according to the third preferred embodiment of the present invention.

FIG. 12 is an explanatory diagram explaining the distance measuring method in accordance with the third preferred embodiment of the present invention.

As shown in the drawing, the optical unit 600 (a front side of the optical system) in the iris recognition system includes the iris recognition camera 601, the distance detection pointers 602 and 603, and the illuminator 604. And, the photographed image 605 includes the spot images 602a and 603b.

Particularly, each distance detection pointer 602 and 603 introduce the corresponding spot images 602a and 603a, respectively. Since these spot images are in symmetric positions to each other with respect to each distance detection pointer 602 and 603, the spot images 602a and 603a are also in symmetric positions to each other on the photographed image 605.

Similar to before, by putting a pair of infrared light emitting diode symmetrically and getting the symmetric spot images therefrom, it is easy to do the distance measurement because the location and the angle of the projected light are maximized, and any reflection from things like the glasses can be removed.

To measure the distance between the user and the camera, the distance detection pointers 602 and 603 are actuated, and in result, the infrared spot images 602a and 603a are formed on the user. The spot images 602a and 603a are projected primarily to the user's face.

Once the infrared spot images 602a and 603a are sent out of the distance detection pointers 602 and 603, the iris recognition camera 601 then photographs the user's face image. At this time, the infrared spot images 602a and 603a on the user's face are also acquired.

One thing to notice here is that the location, size and distinctiveness (or sharpness) of the infrared spot images 602a and 603a vary, depending on the distance (D) between the user and the iris recognition camera.

That is to say, the size and the sharpness of the infrared spot images 602a and 603a as well as the location, size and brightness of the spot images on the user's face are different in case the distance between the user and the camera is far or near. For example, the infrared spot images 602 and 603a tend to be sharper near the focus, and smaller as they become more distant from the operation domain limit of the iris recognition.

In addition, because the distance detection pointers 602 and 603 manifest changes in the size, sharpness and location of the two infrared spot images 602a and 603a by crossing them symmetrically, it is easier to track the changes in the two spot images more easily.

In this way, the distance measurer can calculate the distance (D) between the user and the iris recognition camera by analyzing the characteristics described above, and it is confirmed whether or not the user has entered into the iris recognizable domain, the domain where the camera is focused. If he did enter into the iris recognizable domain, the iris recognizer is actuated and starts the iris recognition using a single focus lens.

Meanwhile, for the sake of the user's convenience, the system can specify the distance between the user subject to the measurement and the camera by categorizing the distance into three categories, such as, an appropriate distance, a far distance, and a near distance, and let the user know this through a designated indicator. For example, if the distance between the user and the camera is appropriate, a green light is turned on, and if the distance is too near, a yellow light is turned on, and if the distance is too far, a red light is turned on so that the user can change his position accordingly. One more thing to know here is that after the user's position is calculated, it is also possible to obtain a very accurate iris image of the user without moving the user by using zoom in/zoom out and autofocus functions of the iris recognition camera.

The spot images for measuring the distance are not visible to the user at all since the invisible infrared rays are used. Also, on top of the usage convenience of the infrared rays, another merit of using the infrared rays is that the user does not have to feel insecure about projecting the infrared spot images to his face.

Furthermore, using the information on the measured distance, the system can let the user know whether he is at appropriate distance from the camera, or whether he should move closer to the camera or farther from it. In this way, the system helps the user to find the most appropriate position for photographing his iris and eventually for better iris recognition.

The present embodiment enables to measure the distance between the user and the camera by projecting a pair of infrared spot images to the user's face, and finding out where the spot images the iris recognition photographed are located on the face.

Especially, a more accurate distance between the user and the camera can be obtained by analyzing how big and bright the infrared spot images.

In short, the present embodiment of the present invention enables to measure the distance between the user and the camera using an infrared pointer that is inexpensive and easy to operate, without using a separate distance measurement sensor.

Moreover, the embodiment enables to measure the distance between the user and the camera through a real time analysis of the images that are photographed by the iris recognition camera. This distance information is used for the system to focus the camera more automatically and accurately for a better iris recognition, or for letting the user know the distance and the direction he should move.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for adjusting a focus position in an iris recognition system, the method comprising:
   projecting a designated light which forms an image on a user;
   acquiring at least one user image including the image of the designated light; and
   measuring the distance between the user and the camera by extracting out the image formed by the designated light from the acquired user image and analyzing characteristics of the image of the designated light.

2. The method of claim 1, wherein the designated light has a wavelength that is invisible to the eyes of the user.

3. The method of claim 1, wherein the characteristics of the image include at least one of size, location, brightness or sharpness of the image.

4. The method of claim 1, further comprising displaying an extent of the distance to the user after measuring the distance between the user and the camera.

5. The method of claim 4, wherein the light is infrared light, the extent is indicated by color, and the designated light is projected onto the face of the user.

6. A method for adjusting a focus position in an iris recognition system, the method comprising:
   irradiating at least one designated spot image on a user using a light beam, of which an irradiation axis intersects with respect to an iris recognition camera;
   acquiring user images including the irradiated at least one designated spot image by using the iris recognition camera; and
   calculating the distance between the user and the iris recognition camera based on characteristics of the at least one designated spot image that is extracted from the acquired user images.

7. The method of claim 6, wherein the at least one designated spot image for measuring the distance is formed of a light having an invisible wavelength to the naked eyes of the user.

8. The method of claim 6, wherein the characteristics of the at least one spot image include at least one of size, location, brightness, or sharpness of the at least one spot image.

9. An apparatus for adjusting a focus position in an iris recognition system, the apparatus comprising:
   an iris recognition camera, which photographs user images;
   a plurality of distance detection pointers in symmetric positions with respect to the iris recognition camera, which projects light to form spot images on a user; and
   a distance calculator, which calculates the distance between the user and the iris recognition camera by performing an image process analysis on the user images, which have been photographed by the iris recognition camera and which have been projected by the distance detection spot light, wherein the distance calculation is based on the spot images on the user images.

10. The apparatus of claim 9, wherein the plurality of distance detection pointers is an infrared light emitting diode.

11. The apparatus of claim 9, wherein the spot images, which are formed by the light irradiated from the distance detection pointer, are projected to the user after irradiation axes of the distance detection pointer are crossed to each other.

12. The apparatus of claim 9, wherein the distance calculator further comprises:
   a first detector for detecting locations of the spot images;
   a second detector for detecting sizes of the spot images; and
   a third detector for detecting sharpness of the spot images.

13. The apparatus of claim 9, further comprising a designated indicator for notifying a result from the distance calculator to the user.

14. A method for an iris recognition system, the method comprising:
   forming a light image on a user using a light beam;
   taking a picture of the light image using a camera;
   extracting the light image from the picture; and
   determining the distance between the user and the camera based on at least one characteristic of the extracted light image adjusting the focus position in the iris recognition system using the determined distance.

15. The method of claim 14, wherein the at least one characteristic of the light image includes at least one of size, location, brightness, or sharpness, and the light image is formed from infrared light.

* * * * *